(12) United States Patent
Kreider et al.

(10) Patent No.: US 9,747,197 B2
(45) Date of Patent: Aug. 29, 2017

(54) METHODS AND APPARATUS TO USE AN ACCESS TRIGGERED COMPUTER ARCHITECTURE

(71) Applicant: HONEYWELL INTERNATIONAL INC., Morristown, NJ (US)

(72) Inventors: Thom Kreider, Peoria, AZ (US); Jon Douglas Gilreath, Peoria, AZ (US); Gary Warnica, Phoenix, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 288 days.

(21) Appl. No.: 14/282,912

(22) Filed: May 20, 2014

(65) Prior Publication Data
US 2015/0339220 A1 Nov. 26, 2015

(51) Int. Cl.
| | | |
|---|---|---|
| G06F 15/82 | (2006.01) | |
| G06F 9/302 | (2006.01) | |
| G06F 12/02 | (2006.01) | |
| G06F 9/30 | (2006.01) | |
| G06F 9/44 | (2006.01) | |
| G06F 9/54 | (2006.01) | |

(52) U.S. Cl.
CPC .......... G06F 12/023 (2013.01); G06F 9/3001 (2013.01); G06F 9/30043 (2013.01); G06F 9/4436 (2013.01); G06F 9/544 (2013.01); G06F 9/547 (2013.01); G06F 15/82 (2013.01); G06F 2212/251 (2013.01); G06F 2212/2515 (2013.01); G06F 2212/6042 (2013.01)

(58) Field of Classification Search
CPC .. G06F 9/3001; G06F 9/30043; G06F 9/4435; G06F 9/4436; G06F 12/023; G06F 2212/251; G06F 2212/2515; G06F 2212/6042; G06F 9/544; G06F 15/82; G06F 9/547; G06D 2212/251; G06D 2212/2515; G06D 2212/6042
USPC .............................................. 712/25–27, 221
See application file for complete search history.

(56) References Cited

U.S. PATENT DOCUMENTS

| | | | |
|---|---|---|---|
| 5,184,347 A | | 2/1993 | Farwell et al. |
| 5,369,766 A | * | 11/1994 | Nakano ............... G06F 9/44521 717/116 |
| 5,537,567 A | * | 7/1996 | Galbraith ............ G06F 11/1076 711/114 |
| 5,617,570 A | | 4/1997 | Russell et al. |
| 5,623,684 A | | 4/1997 | El-Ghoroury et al. |
| 6,408,428 B1 | | 6/2002 | Schlansker et al. |

(Continued)

OTHER PUBLICATIONS

Tempere University of Technology; About Transport-Triggered Architectures [Retrieved by internet: http://tce.cs.tut.fi/tta.html] Jan. 28, 2014.

(Continued)

*Primary Examiner* — Daniel Pan
(74) *Attorney, Agent, or Firm* — Lorenz & Kopf, LLP

(57) ABSTRACT

A method for using an access triggered architecture for a computer implemented application is provided. The method receives a set of data at a designated functional block associated with a system memory location; performs an operation at the designated functional block, using the set of data, to generate a result, wherein the operation is performed each time information is received at the designated functional block; and returns the generated result to the system memory location.

20 Claims, 6 Drawing Sheets

(56) References Cited

U.S. PATENT DOCUMENTS

| | | | |
|---|---|---|---|
| 7,415,689 | B2 | 8/2008 | Taylor |
| 7,669,041 | B2* | 2/2010 | Khailany ............... G06F 9/3001 712/225 |
| 7,694,084 | B2 | 4/2010 | Raghavan et al. |
| 7,823,091 | B2 | 10/2010 | Dennison et al. |
| 8,520,812 | B2 | 8/2013 | Weissman |
| 2008/0039070 | A1 | 2/2008 | Ptashek |
| 2009/0316657 | A1 | 12/2009 | Singh et al. |
| 2012/0063497 | A1 | 3/2012 | Kim et al. |
| 2012/0216012 | A1* | 8/2012 | Vorbach ................. G06F 8/443 712/11 |
| 2013/0173828 | A1 | 7/2013 | Todd et al. |

OTHER PUBLICATIONS

Heikkinen, et al.; On efficiency of transport Triggered Atchitectures in DSP Applications [Retrieved from internet: http://www.cs.tut.fi/~move/doc/WSEAS02.pdf] Jan. 28, 2014.

Niiranen, Miika; Transport Triggered Archetectures on FPGA [Retrieved from internet: http://www.cs.tut.fi/~move/doc/TTAs_On_FPGA_v1.1.pdf] Jan. 28, 2014.

Hauser, et al.; Transport Triggered Interconnection Network for a Scalable Application-Specific Processor [Retrieved from internet: http://www.aes.tu-berlin.de/fileadmin/fg196/publication/ttn.pdf] Jan. 28, 2014.

Hoogerbrugge, et al.; Transport-Triggering vs. Operation-Triggering [Retrieved from internet; http://citeseerx.ist.psu.edu/viewdoc/download?doi=10.1.1.46.4261&rep=rep1&type=pdf] Jan. 28, 2014.

Corporaal, et al.; Using Transport Triggered Architectures for Embedded Processor Design [Retrieved from internet: http://citeseerx.ist.psu.edu/viewdoc/download?doi=10.1.1.30.1278&rep=rep1&type=pdf] Jan. 28, 2014.

EP Extended Search Report for Application No. EP 15165820.0 Dated Jul. 10, 2015.

EP Examination Report for Application No. EP 15165820.0 Dated Mar. 14, 2016.

EP Examination Report for Application No. EP 15165820.0 dated Dec. 13, 2016.

* cited by examiner

METHODS AND APPARATUS TO USE AN ACCESS TRIGGERED COMPUTER ARCHITECTURE

TECHNICAL FIELD

Embodiments of the subject matter described herein relate generally to computer architecture systems. More particularly, embodiments of the subject matter relate to the implementation and use of an access triggered computer architecture system.

BACKGROUND

General purpose processors experience high failure rates during execution of applications that rely on time-critical operations. As one example, when building an engine controller, there are specialized considerations based on time-critical factors. For instance, a valve is required to move at a very precise time in order to avoid collision with a piston. Here, a general purpose processor architecture would not provide the most advantageous implementation.

Accordingly, it is desirable to provide a time-conscious computing architecture and method for its use, for applications in which time is an important concern. Furthermore, other desirable features and characteristics will become apparent from the subsequent detailed description and the appended claims, taken in conjunction with the accompanying drawings and the foregoing technical field and background.

BRIEF SUMMARY

Some embodiments provide a method for using an access triggered architecture for a computer implemented application is provided. The method receives a set of data at a designated functional block associated with a system memory location; performs an operation at the designated functional block, using the set of data, to generate a result, wherein the operation is performed each time information is received at the designated functional block; and returns the generated result to the system memory location.

Some embodiments provide an access triggered architecture system for a computer implemented application. The system includes an instruction module, configured to retrieve an executable instruction from a table stored in system memory; a data transfer module, configured to relocate a dataset from a first memory location to a second memory location, based on the retrieved executable instruction; and a functional block module, configured to perform an operation using the relocated dataset to generate a result, and to replace the dataset with the result in the second memory location.

Some embodiments provide a non-transitory, computer-readable medium containing instructions thereon, which, when executed by a processor, perform a method. The method associates a system memory location with a particular function to create a functional block; executes the function, using a set of input data, when the set of input data is received at the system memory location, to produce a set of output data; and returns the set of output data to the system memory location.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The subject matter presented herein relates to apparatus and methods for initializing and using an access triggered computer architecture. An access triggered architecture includes a plurality of functional blocks. Each functional block performs an operation using an input dataset received at an associated system memory address. In certain embodiments, a system memory address is associated with a functional block, which performs an operation using an input dataset stored at the system memory address. Generally, when a dataset is received at a particular memory address, the functional block associated with the memory address performs an arithmetic and/or logical operation using the received dataset, and then returns a result.

Figure 1:
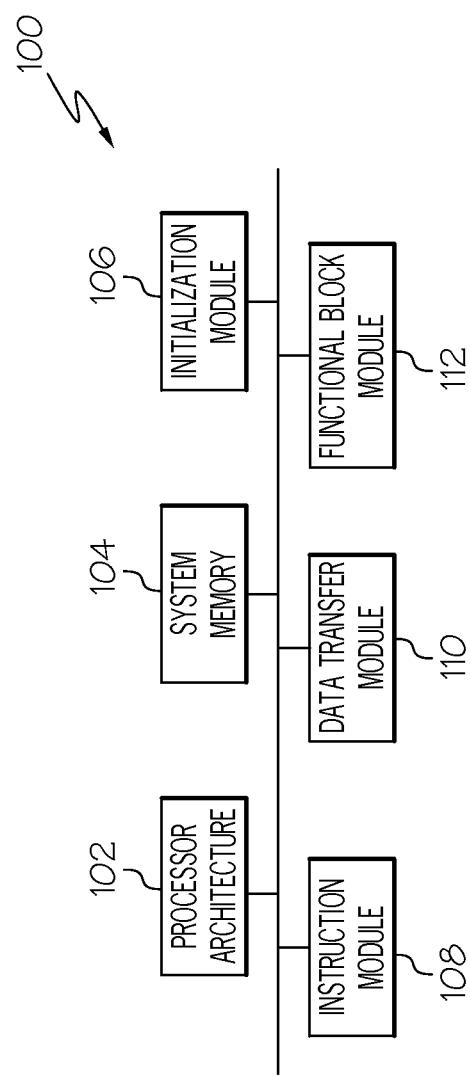
FIG. 1 is a schematic block diagram representation of an access triggered architecture system, according to some embodiments.

FIG. 1 is a schematic block diagram representation of an access triggered architecture system 100, according to some embodiments. The access triggered architecture system 100 may be implemented using any desired platform, but will generally be implemented using one or more state-machines implemented within a Field Programmable Gate Array (FPGA). For example, the access triggered architecture system 100 could be realized as any of the following, without limitation: a data multiplexor/de-multiplexor, a remote data concentrator, a bus translator (e.g., Ethernet to MIL-1553), a specialized piece of diagnostic equipment, an embedded processor-based device or system, or any other device that includes a processor architecture 102 and system memory 104. Alternatively, an access triggered architecture system 100 may be used to realize a number of implementations using any type of controller associated with embodiments, including but not limited to: network data handling, control of aircraft input and output (I/O) signals, home water heating, or the like.

The access triggered architecture system 100 may include, without limitation: a processor architecture 102; a system memory 104; an initialization module 106; an instruction module 108; a data transfer module 110; and a functional block module 112. In practice, various embodiments of the access triggered architecture system 100 may include additional or alternative elements and components, as desired for the particular application. These elements and features of the access triggered architecture system 100 may be operatively associated with one another, coupled to one another, or otherwise configured to cooperate with one another as needed to support the desired functionality—in particular, providing features specific to an access triggered architecture, as described herein. For ease of illustration and clarity, the various physical, electrical, and logical couplings and interconnections for these elements and features are not depicted in FIG. 1. Moreover, it should be appreciated that embodiments of the access triggered architecture system 100 will include other elements, modules, and features that cooperate to support the desired functionality. For simplicity, FIG. 1 only depicts certain elements that relate to the access triggered architecture features, described in more detail below.

The processor architecture 102 may be implemented using any suitable processing system, such as one or more processors (e.g., multiple chips or multiple cores on a single chip), controllers, microprocessors, microcontrollers, processing cores and/or other computing resources spread across any number of distributed or integrated systems, including any number of "cloud-based" or other virtual systems. Alternatively, the processor architecture 102 is not implemented using a microcontroller or processor; in this case, the access triggered architecture system 100 utilizes microcontroller and/or processor components relevant to a particular application.

The processor architecture 102 is configured to communicate with system memory 104. The system memory 104 represents any non-transitory short or long term storage or other computer-readable media capable of storing programming instructions for execution on the processor architecture 102, including any sort of random access memory (RAM), read only memory (ROM), flash memory, magnetic or optical mass storage, and/or the like. It should be noted that the system memory 104 represents one suitable implementation of such computer-readable media, and alternatively or additionally, the processor architecture 102 could receive and cooperate with external computer-readable media realized as a portable or mobile component or application platform, e.g., a portable hard drive, a USB flash drive, an optical disc, or the like.

The initialization module 106 is configured to create a plurality of functional blocks utilized in the access triggered architecture system 100. The initialization module 106 accomplishes this by associating an operation or function relevant to a particular application with a location in system memory 104 to create the functional block. During execution of the particular application, the functional block is configured to perform the same operation, consistently, each time a set of data arrives at the associated memory location.

The instruction module 108 is configured to retrieve instructions from a storage location in system memory 104, to recognize the information included in each instruction, and to initiate execution of the instructions. Generally, each instruction includes the information required to move a set of data from a location in system memory, at which the data is stored, to a new location in system memory 104. Each instruction includes two pointers: a source pointer and a destination pointer. The source pointer references a source location in system memory 104, from which a set of data will be moved when the instruction is executed. The destination pointer references a destination location in system memory 104, where the set of data will be moved. Each source location and each destination location within the system memory block 104 may be assigned to memory, I/O, or a functional block. In certain embodiments, a particular application using access triggered architecture system 100 utilizes an instruction table comprising a plurality of instructions. Each instruction table is specific to a particular application, and when the instruction table is executed, each instruction is performed sequentially. Instruction tables may be used individually or in combination with one or more additional instruction tables.

In some embodiments, the instruction module 108 is configured to perform a loop, once the end of the table has been reached, by returning to the beginning of the table and executing the sequence of instructions again. In other embodiments, the instruction module 108 is configured to execute another table, upon reaching the end of a particular instruction table. In some embodiments, the instruction module 108 is configured to execute one list of instructions only, and to cease execution once the end of the instruction list has been reached. In some embodiments, the execution of an instruction list occurs when triggered by an external event.

The data transfer module 110 is configured to receive instruction information from the instruction module 108, and to carry out the relocation of a dataset specified in each instruction. Generally, the data transfer module 110 accesses a source pointer and a destination pointer in each instruction, identifies a source location associated with the source pointer, identifies a destination location associated with the destination pointer, retrieves a set of data from the source location, and transmits the set of data to the destination location.

The functional block module 112 is suitably configured to perform an operation using a set of data received at a destination location. Each destination location is indicated by a system memory address. Generally, a functional block is associated with a destination location and, when a set of data is received at a particular destination location indicated by a particular system memory address, the functional block is triggered. Once triggered, the functional block performs a designated operation. The designated operation is consistently performed for each set of data received at the particular destination location associated with the functional block.

Operations performed by a functional block alter the received data in one or more ways. Operations may include arithmetic operations, logical operations, and/or any specialized functions applicable to a task performed by an access triggered architecture system 100. In certain embodiments, a designated operation associated with and performed by a particular functional block may include more than one basic operation. For example, a Functional Block A may be configured to increment a received set of data, while Functional Block B may be configured to increment the set of data and to perform a logical OR operation with a second set of data, to generate a result. Specialized functions may include calculation of cyclic redundant checks (CRC's), encryption/decryption steps, stripping headers from Ethernet packets, performing a search for a sequence of characters in one or more data streams, or the like. This specialization of functional blocks permits the association of a process with a designated functional block, and the creation of a reusable library of functional blocks, which optimizes efficiency of the access triggered architecture system 100.

To enable the performance of useful tasks by the access triggered architecture system 100, locations within system memory 104 are not exclusively mapped to memory devices. In some embodiments, system memory 104 locations are mapped to specialized locations used for data input and output. In some embodiments, system memory 104 locations are mapped to dedicated functions within the functional block module 112. For example, the access triggered architecture system 100 is configured to read some external information (e.g., a current air speed) from a specialized location within system memory 104. This specialized system memory 104 location may be referred to as an "in-mailbox". The access triggered architecture system 100 then stores the information to a second specialized system memory 104 location, which is associated with a functional block. For purposes of this example, the functional block is configured to perform a "compare" operation, with a received set of data. The access triggered architecture system 100 then transfers a value from system RAM memory (e.g., an air speed upper limit) into a third specialized memory location associated with the same functional block. The functional block performs the "compare" function, comparing the two data values and producing a result, which is then stored in a third specialized memory location. In certain embodiments, that result may be stored in a fourth specialized location in system memory (e.g., an "out-mailbox"), at which the result is available for retrieval by other functional blocks and/or systems within the access triggered architecture system 100. For this particular example, the comparison result between the current air speed and an air speed upper limit may be used to adjust an external setting, such as an engine throttle setting.

In practice, the initialization module 106, the instruction module 108, the data transfer module 110, and/or the functional block module 112, may be implemented with (or cooperate with) the processor architecture 102 to perform at least some of the functions and operations described in more detail herein. In this regard, the initialization module 106, the instruction module 108, the data transfer module 110, and/or the functional block module 112, may be realized as suitably written processing logic, application program code, or the like.

Figure 2:
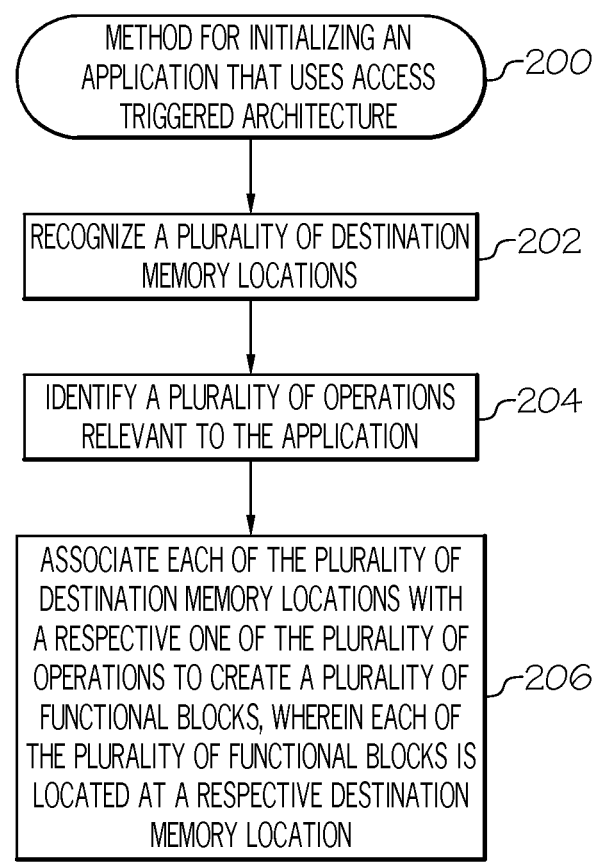
FIG. 2 is a flow chart that illustrates an embodiment of a process for initializing an application that uses access triggered architecture.

FIG. 2 is a flow chart that illustrates an embodiment of a process 200 for initializing an application that uses access triggered architecture. In certain embodiments, an application may include executable instructions enabling use of an access triggered architecture as a tool to accomplish one or more specific tasks. First, the process 200 recognizes a plurality of destination memory locations (step 202). The destination memory locations include system memory addresses to which one or more sets of data will be transferred. The plurality of destination memory locations are predefined at design time. Here, the process 200 recognizes a predefined block of storage in system memory, consisting of a plurality of system memory addresses.

Next, the process 200 identifies a plurality of operations relevant to the application (step 204). The plurality of operations may comprise any instruction that the process 200 is capable of executing, and that is distinguishable as an instruction applicable to the application. Generally, each of the plurality of operations includes an arithmetic and/or logical operation. In certain exemplary embodiments, each of the plurality of operations includes a single or one-step function. In other embodiments, each of the plurality of operations may include a combination of functions.

After recognizing applicable destination memory locations (step 202), and identifying a plurality of operations relevant to the application (step 204), the process 200 associates each of the plurality of destination memory locations with a respective one of the plurality of operations to create a plurality of functional blocks, wherein each of the plurality of functional blocks is located at a respective destination memory location (step 206). Here, the process 200 creates a connection between one of the identified, relevant operations to a destination memory location, resulting in a functional block. Each functional block performs an associated operation when a set of data is received at the destination memory location. Here, a group of functional blocks are created by associating a group of operations with a group of memory locations. Although each functional block generally performs just one task, these functional blocks may be used in combination with one another to perform more complex tasking.

Figure 3:
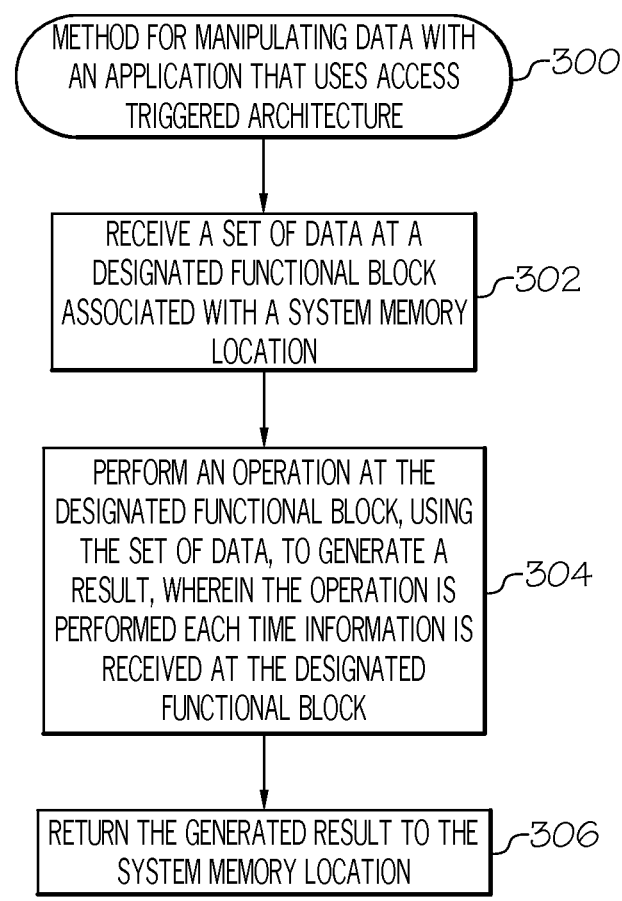
FIG. 3 is a flow chart that illustrates an embodiment of a process for manipulating data with an application that uses an access triggered architecture.

FIG. 3 is a flow chart that illustrates an embodiment of a process 300 for manipulating data with an application that uses an access triggered architecture. First, the process 300 receives a set of data at a designated functional block associated with a system memory location (step 302). In one implementation, an access triggered architecture may be utilized by an aircraft, and in this example, the set of data may include position information for aircraft control surfaces (flaps, elevators, etc), engine temperatures, airspeeds, fuel weight, global positioning system (GPS) information, engine performance parameters, automatic flight control parameters, or the like.

Figure 4:
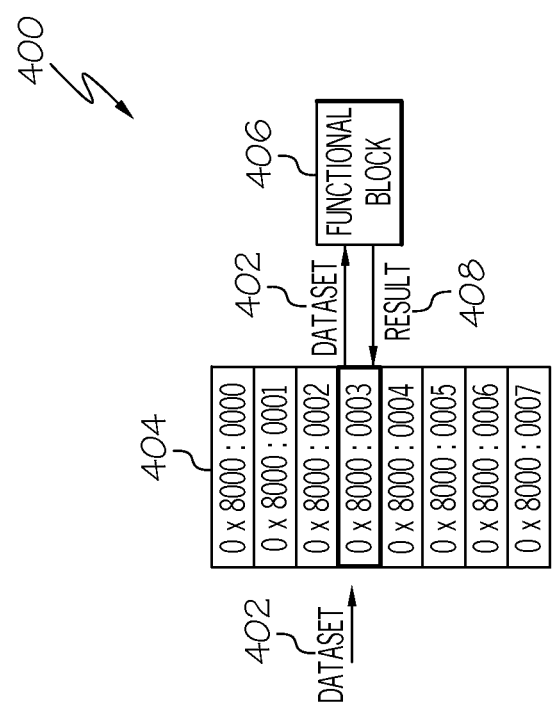
FIG. 4 is a diagram representation of a subset of system memory, configured to access a functional block comprising a single operation, according to some embodiments.

Next, the process 300 performs an operation at the designated functional block, using the set of data, to generate a result, wherein the operation is consistently performed each time information is received at the designated functional block (step 304). In certain embodiments, the operation may include a single function, as illustrated in FIG. 4. FIG. 4 is a diagram representation of an access triggered architecture system 400, including a subset of system memory 404, configured to access a functional block 406 comprising a single operation, according to some embodiments. As shown, a dataset 402 is received at memory location 0x8000:0003, which is associated with a functional block 406. The functional block 406 executes a single function, or one-step operation, using the received dataset 402. Exemplary embodiments of single operations may include, without limitation: arithmetic operations (e.g., increment, decrement, etc.), logical operations (e.g., AND, OR, XOR, etc.), or the like. Once the single function is performed, the functional block 406 returns a result 408 to the same memory location. Thus, the original dataset 402 transmitted to memory location 0x8000:0003 is changed; when the contents of memory location 0x8000:0003 are retrieved at a future time (e.g., during a subsequent clock cycle), the original dataset 402 will no longer be available.

Figure 5:
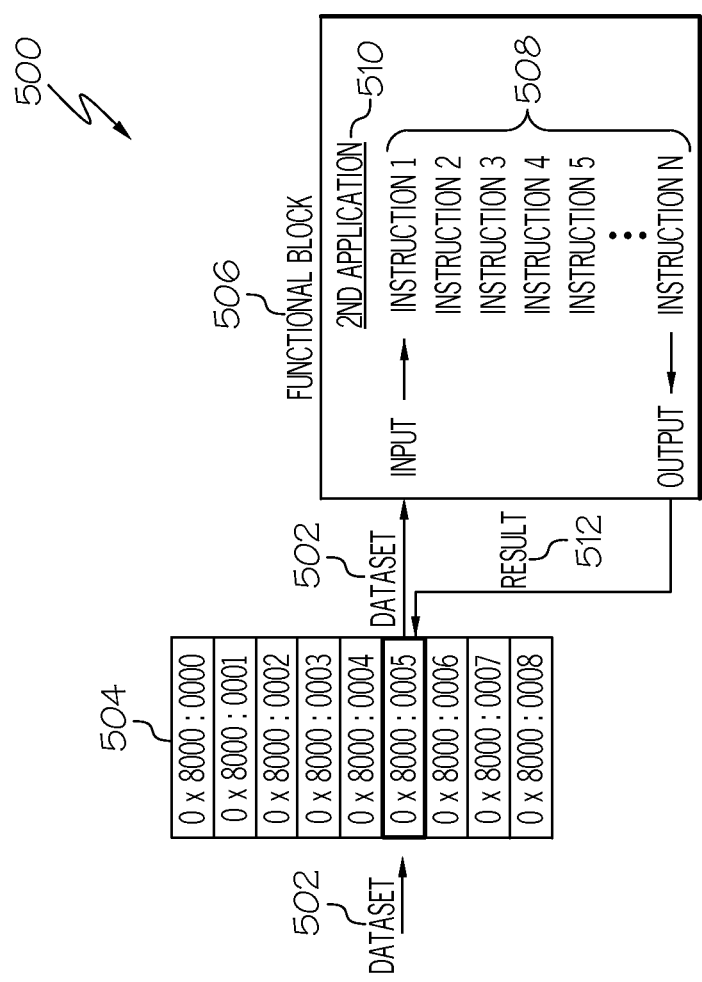
FIG. 5 is a diagram representation of a subset of system memory, configured to access a functional block comprising a second instruction set, according to some embodiments.

In some embodiments, the operation may include an entirely new set of instructions to be performed, as shown in FIG. 5. FIG. 5 is a diagram representation of a subset of an access triggered architecture system 500, including a subset of system memory 504, configured to access a functional block 506 comprising a second set of instructions 508 for a second application 510, according to some embodiments. As shown, a dataset 502 is received at memory location 0x8000: 0005, which is associated with a functional block 506. The functional block 506 executes an operation using the received dataset 502 and returns a result 512 to the same memory location. This action of transferring the dataset 502 from a source location (not shown) to memory location 0x8000:0005 is performed by a first application during execution of at least one of a first set of instructions.

Once the dataset 502 is received at memory location 0x8000:0005, the dataset 502 is used as an input value to the functional block 506. Functional block 506 executes a second application, or sub-application, including a second set of instructions 508. The second set of instructions 508 is not "seen" or recognized by the first set of instructions, which is associated with the first application. Similar to the first set of instructions, each one of the second set of instructions 508 includes a command to relocate a set of data from a source location to a destination location in system memory. The first instruction, of the second set of instructions 508, relocates the dataset 502 from memory location 0x8000:0005 (i.e., the source location) to another memory address (i.e., the destination location—not shown) for performance of another operation associated with another functional block. In this example, the second application 510 executes the second set of instructions 508, sequentially, to produce an output result 512. Each of the second set of instructions 508 executes a single function or operation, and the entire second set of instructions 508 is used for a more complex operation, requiring more than a one-step function.

As is the case when memory location 0x8000:0005 is associated with a single-step operation, once the output result 512 is generated, the original dataset 502 transmitted to memory location 0x8000:0005 is changed. When the contents of memory location 0x8000:0005 are retrieved at a future time (e.g., during a subsequent clock cycle), the original dataset 502 will no longer be available.

Returning to FIG. 3, after performing the operation (step 304), the process 300 returns the generated result to the system memory location (step 306). As shown with regard to FIGS. 4 and 5, once an operation has been performed using the dataset received at a functional block, the dataset itself has been changed or altered by the operation. This result is then stored at the memory location where the dataset was received, effectively overwriting the original dataset. This updated or "new" dataset resides in the memory location, and is available for retrieval and transfer to another functional block in system memory for purposes of performing another single-step operation or a second application comprising multiple single-step operations.

Figure 6:
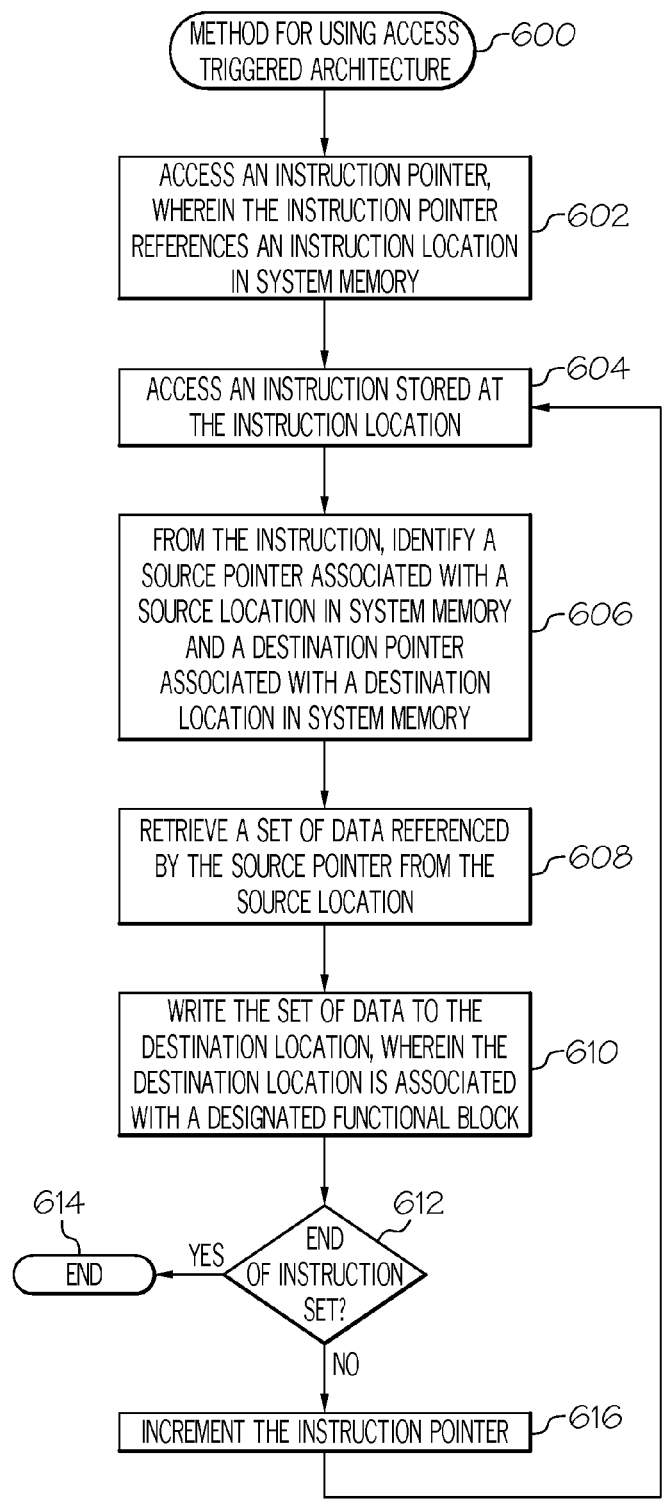
FIG. 6 is a flow chart that illustrates an embodiment of a process for using access triggered architecture.

FIG. 6 is a flow chart that illustrates an embodiment of a process 600 for using access triggered architecture. First, the process 600 receives an instruction pointer, wherein the instruction pointer references a first instruction location in system memory (step 602). The instruction pointer indicates a system memory address at which a first instruction, for a given application, resides. Each application includes a plurality of executable instructions, and the instruction pointer is accessed to begin execution of a particular application.

Next, the process 600 accesses a first instruction stored at the first instruction location (step 604). From the first instruction, the process 600 identifies a source pointer associated with a source location in system memory and a destination pointer associated with a destination location in system memory (step 606). Each instruction includes, at minimum, a source pointer and a destination pointer. Each of these pointers reference an address in system memory, and the system memory is capable of storing a set of data at each address.

The process 600 then retrieves a set of data, referenced by the source pointer, from the source location (step 608), and writes the set of data to the destination location, wherein the destination location is associated with a designated functional block (step 610). The purpose of the process 600 is to execute a series of instructions, in sequence. Each instruction moves a set of data from a source memory location to a destination memory location, enabling a functional block at the destination memory location to perform an operation using the set of data.

After writing the set of data to the destination location in system memory (step 610), the process 600 determines whether the end of the instruction set has been reached (step 612). The process 600 performs data transfers from one system location to another. All behavior of the process 600, including stopping, looping, or execution of new list is encoded within the instructions being executed. In one example, the process 600 performs a loop, in order to execute the instruction set again. In this example, the final instruction of the instruction set may include an instruction to reload the instruction pointer with the address of the beginning of the same list. Alternatively, the final instruction may be to read a functional block until that functional block changes the result to address a new list, or the final instruction may be to repeat the current instruction list only upon occurrence of a detected event.

If the end of the instruction set has been reached (the "Yes" branch of step 612), then the process 600 ends. If the end of the instruction set has not been reached (the "No" branch of step 612), then the process 600 increments the instruction pointer (step 616), and returns to the beginning of the process 600 to access an instruction stored at the instruction location indicated by the incremented instruction pointer (step 604). Each of the executable instructions is stored in sequential order in system memory, for ease of execution. In certain embodiments, a plurality of executable instructions comprises an "instruction table" for an application, including a plurality of instructions stored in sequential order, or in other words, stored in the order in which each instruction will be executed. Each instruction is stored at a particular location in system memory, and each of these locations is referenced by a system memory address. The instruction pointer directs the process 600 to the system memory address of the first instruction of the instruction table. Once incremented, the instruction pointer points to the next memory location at which an instruction is stored, and the process 600 returns to step 604 and begins again.

In certain embodiments, the process 600 first receives an instruction table for an application, prior to the execution of step 602. Here, the instruction table comprises a plurality of instructions, and the instruction stored at the instruction location indicated by the instruction pointer is one of the instructions found in the instruction table. Each of the plurality of instructions, contained in the instruction table, comprises a command to move information form a source memory location to a destination memory location. Using the instruction table, the process 600 executes each of the plurality of instructions, sequentially, through the process 600 steps described in FIG. 6. Each time the instruction pointer is incremented (step 616), the process 600 moves forward to execute the next step in the instruction table. In some embodiments, when each of the plurality of instructions has been executed, sequentially, the process 600 receives a second instruction table comprising a second plurality of instructions, and executes each of the second plurality of instructions sequentially, wherein each of the second plurality of instructions also comprises a command to move information from a source memory location to a destination memory location associated with a functional block.

The various tasks performed in connection with processes 200, 300, and 600 (described with regard to FIGS. 2, 3, and 6) may be performed by software, hardware, firmware, or any combination thereof. For illustrative purposes, the preceding descriptions of processes 200, 300, and 600 may refer to elements mentioned in connection with FIGS. 1, 4, and 5. In practice, portions of processes 200, 300, and 600 may be performed by different elements of the described system. It should be appreciated that processes 200, 300, and 600 may include any number of additional or alternative tasks, the tasks shown in FIGS. 2, 3, and 6 need not be performed in the illustrated order, and processes 200, 300, and 600 may each be incorporated, individually or in combination, into a more comprehensive procedure or process having additional functionality not described in detail herein. Moreover, one or more of the tasks shown in FIGS. 2, 3, and/or 6 could be omitted from an embodiment of one or more of the processes 200, 300, or 600 as long as the intended overall functionality remains intact.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for using an access triggered architecture for a computer implemented application, the method comprising:
   obtaining an instruction consisting of a source pointer and a destination pointer from a table stored in system memory;

retrieving a set of data from a first system memory location indicated by the source pointer;
relocating the set of data to a second system memory location of a designated functional block, wherein the second system memory location is indicated by the destination pointer, to trigger execution of a particular operation associated with the second memory location, based on the instruction, wherein the designated functional block is configured to execute the particular operation when triggered, and wherein the designated functional block is triggered each time data is received at the second system memory location;
performing the particular operation by the designated functional block at the second system memory location, using the set of data, to generate a result, wherein the particular operation is performed each time information is received at the designated functional block, wherein the particular operation is associated with the functional block at the second system memory location; and
returning the generated result to the second system memory location.

2. The method of claim 1, further comprising:
recognizing a plurality of destination memory locations, wherein the second system memory location comprises one of the plurality of destination memory locations;
identifying a plurality of operations relevant to the computer implemented application; and
associating each of the plurality of destination memory locations with a respective one of the plurality of operations to create a plurality of functional blocks, wherein each of the plurality of functional blocks is located at a respective destination memory location;
wherein the particular operation comprises one of the plurality of operations; and
wherein the designated functional block comprises one of the plurality of functional blocks.

3. The method of claim 2, further comprising:
receiving an instruction table for the computer implemented application, the instruction table comprising a plurality of instructions; and
executing each of the plurality of instructions sequentially, wherein each of the plurality of instructions comprises a command to move information from a source memory location to one of the plurality of destination memory locations;
wherein the set of data is received due to executing one of the plurality of instructions.

4. The method of claim 3, wherein the designated functional block comprises an input access for a second computer implemented application, the second computer implemented application comprising a second plurality of instructions; and
wherein the performing step further comprises executing the second plurality of instructions to generate the result.

5. The method of claim 3, further comprising:
when the plurality of instructions has been executed, performing a loop to repeat the executing step.

6. The method of claim 3, further comprising:
when the plurality of instructions has been executed,
receiving a second instruction table, comprising a second plurality of instructions; and
executing each of the second plurality of instructions sequentially, wherein each of the second plurality of instructions comprises a command to move information from a source memory location to one of the plurality of destination memory locations.

7. The method of claim 1, wherein the performing step comprises performing a single operation; and
wherein the single operation comprises an arithmetic logic unit (ALU) function.

8. The method of claim 1, further comprising:
identifying a source pointer associated with a source location in system memory, and a destination pointer associated with a destination location in system memory;
retrieving the set of data referenced by the source pointer from the source location; and
writing the set of data to the destination location, wherein the destination location comprises the second system memory location.

9. The method of claim 8, further comprising:
receiving an instruction pointer, wherein the instruction pointer references a first instruction location in system memory;
accessing a first instruction, stored at the first instruction location; and
extracting the source pointer and the destination pointer from the first instruction.

10. The method of claim 9, further comprising:
incrementing the instruction pointer, wherein the incremented instruction pointer references a second instruction location in system memory; and
accessing a second instruction, stored at the second instruction location.

11. An access triggered architecture system for a computer implemented application, the system comprising:
an instruction module, configured to retrieve an instruction consisting of a source pointer and a destination pointer from a table stored in system memory;
a data transfer module, configured to relocate a dataset from a first memory location indicated by the source pointer to a second memory location indicated by the destination pointer, based on the retrieved instruction, to trigger execution of a particular operation associated with the second memory location; and
a functional block module, configured to:
perform the particular operation using the relocated dataset to generate a result when triggered, wherein the functional block module is triggered each time data is received at the second memory location; and
replace the dataset with the result in the second memory location.

12. The system of claim 11, further comprising an initialization module, configured to:
recognize the second memory location;
identify one or more functions relevant to the computer implemented application; and
associate the second memory location with the one or more functions to create a functional block;
wherein the particular operation comprises one of the one or more functions.

13. The system of claim 11, wherein the table comprises a plurality of executable instructions;
wherein the instruction module is further configured to initiate execution of each of the plurality of executable instructions sequentially, wherein each of the plurality of executable instructions comprises a command to move information from a source memory location to a destination memory location, wherein the first memory location comprises a source memory location and wherein the second memory location comprises a destination memory location; and wherein the dataset is relocated due to executing one of the plurality of instructions.

14. The system of claim 13, wherein the functional block module comprises an input access for a second computer implemented application, the second computer implemented application comprising a second plurality of executable instructions;
   wherein the functional block module is further configured to execute the second plurality of instructions to generate the result.

15. The system of claim 13, wherein the performed operation comprises a single arithmetic operation.

16. A non-transitory, computer-readable storage medium containing instructions thereon, which, when executed by a processor, perform a method comprising:
   associating a second system memory location with a particular function to create a functional block;
   obtaining an instruction consisting of a source pointer and a destination pointer from a table stored in system memory;
   moving a set of data from a first system memory location indicated by the source pointer to the second system memory location indicated by the destination pointer;
   executing the particular function, using the set of data, when the set of data is received at the second system memory location, to produce a set of output data, wherein execution of the particular function is triggered each time data is received at the second system memory location; and
   returning the set of output data to the second system memory location.

17. The non-transitory, computer-readable storage medium of claim 16, wherein the method further comprises:
   identifying a source pointer associated with a source location in system memory, and a destination pointer associated with a destination location in system memory;
   retrieving the set of data referenced by the source pointer from the source location; and
   writing the set of data to the destination location, wherein the destination location comprises the second system memory location.

18. The non-transitory, computer-readable storage medium of claim 17, wherein the method further comprises:
   recognizing an instruction pointer, wherein the instruction pointer references a first instruction location in system memory;
   accessing a first instruction, stored at the first instruction location; and
   extracting the source pointer and the destination pointer from the first instruction.

19. The non-transitory, computer-readable storage medium of claim 18, wherein the method further comprises:
   incrementing the instruction pointer, wherein the incremented instruction pointer references a second instruction location in system memory; and
   accessing a second instruction, stored at the second instruction location.

20. The non-transitory, computer-readable storage medium of claim 16, wherein the method further comprises:
   recognizing a plurality of destination memory locations, wherein the second system memory location comprises one of the plurality of destination memory locations;
   identifying a plurality of operations relevant to a computer implemented application; and
   associating each of the plurality of destination memory locations with a respective one of the plurality of operations to create a plurality of functional blocks, wherein each of the plurality of functional blocks is located at a respective destination memory location;
   wherein the particular function comprises one of the plurality of operations; and
   wherein one of the plurality of functional blocks is associated with the second system memory location.

* * * * *